United States Patent [19]

Richards et al.

[11] Patent Number: 4,577,524
[45] Date of Patent: Mar. 25, 1986

[54] VEHICLE TRANSFER GEAR AND DRIVE LINE BRAKE MECHANISM

[75] Inventors: David L. Richards, Peoria; Willis E. Windish, Pekin, both of Ill.

[73] Assignee: Caterpillar Tractor Co., Peoria, Ill.

[21] Appl. No.: 601,772

[22] PCT Filed: Jun. 18, 1982

[86] PCT No.: PCT/US82/00832

§ 371 Date: Jun. 18, 1982

§ 102(e) Date: Jun. 18, 1982

[51] Int. Cl.⁴ .................. F16H 57/04; F16H 57/10
[52] U.S. Cl. .................................... 74/411.5; 74/467
[58] Field of Search ............... 74/15.8, 15.82, 15.86, 74/411.5, 414, 421 R, 467; 184/6.12; 192/4 A

[56] References Cited

U.S. PATENT DOCUMENTS

| | | |
|---|---|---|
| 1,220,810 | 3/1917 | Alquist . |
| 1,220,811 | 3/1917 | Alquist ............................ 74/467 |
| 1,554,081 | 9/1925 | Garrett ............................ 74/467 |
| 1,604,401 | 10/1926 | Fisher ............................ 74/421 R |
| 2,403,579 | 7/1946 | Carpenter ....................... 184/6.12 |
| 2,984,122 | 5/1961 | Woolley .......................... 74/467 |
| 3,097,546 | 7/1963 | Kelbel et al. .................... 74/467 |
| 3,529,698 | 9/1970 | Nelson ........................... 184/6.12 |
| 3,621,957 | 11/1971 | Howe ............................. 192/4 A |
| 3,625,310 | 12/1971 | Herrick .......................... 184/6.12 |
| 3,802,289 | 4/1974 | Cheer ............................. 74/411.5 |
| 4,378,711 | 4/1983 | Daniel ............................ 74/467 |
| 4,391,351 | 7/1983 | Jirousek et al. .................. 74/467 |
| 4,461,373 | 7/1984 | Pratt et al. ..................... 74/411.5 |
| 4,475,638 | 10/1984 | McCormick ...................... 74/411.5 |

FOREIGN PATENT DOCUMENTS 3015028 10/1980 Fed. Rep. of Germany .

OTHER PUBLICATIONS

Zahnradfabrik Friedrichshafen AG WG-120 Model Transmission circa 1978-1979 per Exhibit "A".

*Primary Examiner*—Lawrence J. Staab
*Attorney, Agent, or Firm*—Charles E. Lanchantin, Jr.

[57] ABSTRACT

A vehicle transfer gear and drive line brake mechanism (16) includes a depending gear transfer train (22) having a rotatable shaft (36) and an output gear (28) connected to the shaft (36). A drive line brake assembly (40) is operatively associated with the shaft (36) on a lower axis (30) and a housing (58,118,120) is provided for defining an enclosed compartment (116) for containing them and a common lubricating fluid. A baffle element (186) divides the enclosed compartment (116) into a brake chamber (126) containing the brake assembly (40) and a separate sump chamber (126) and directs fluid away from the brake chamber (126) to the sump chamber (126) in response to rotation of the shaft (36) in order to reduce fluid drag losses.

17 Claims, 5 Drawing Figures

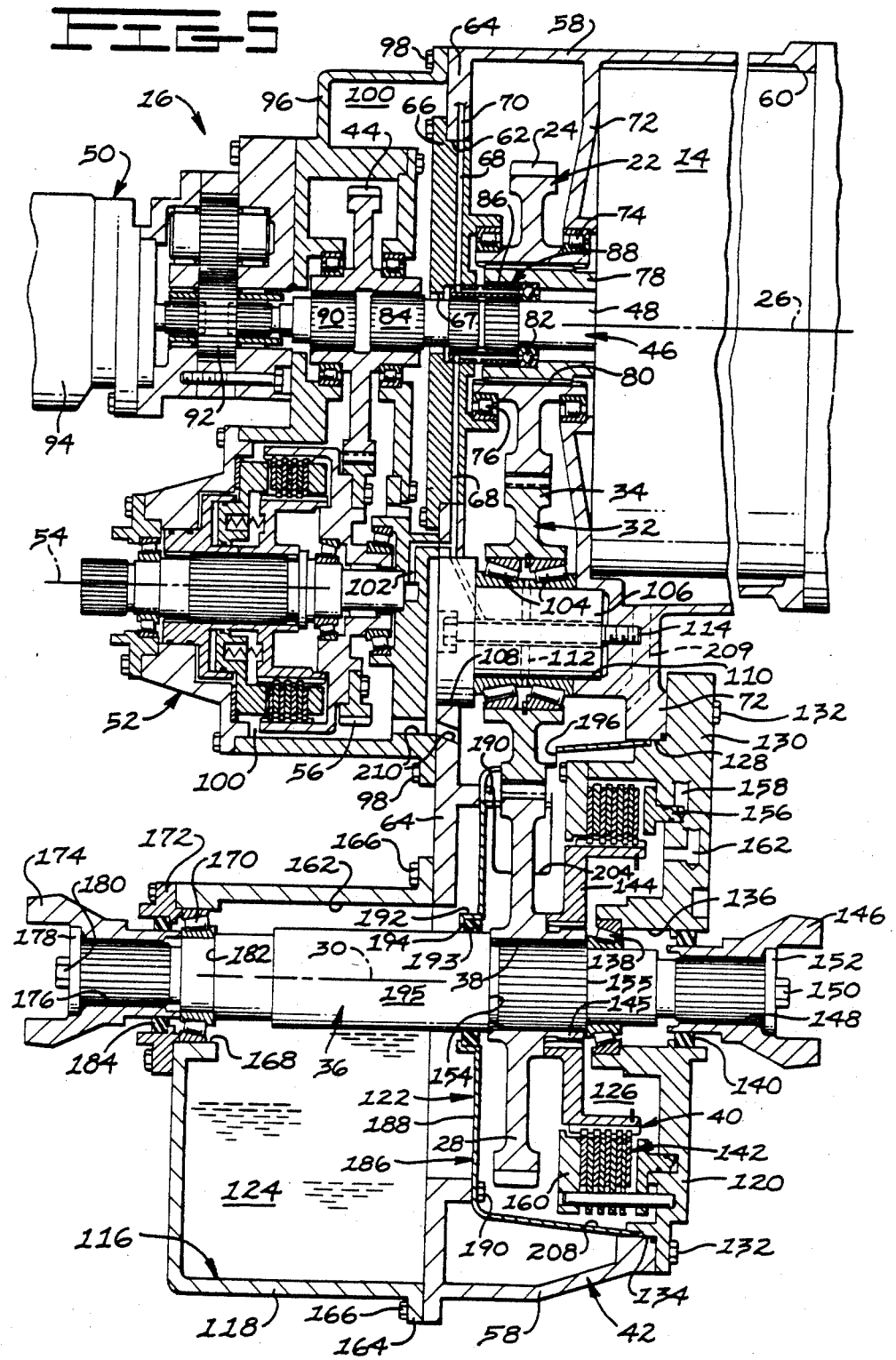

VEHICLE TRANSFER GEAR AND DRIVE LINE BRAKE MECHANISM

DESCRIPTION

1. Technical Field

This invention relates generally to a vehicle transfer gear and drive line brake mechanism, and more particularly to a depending gear transfer train and a drive line brake assembly and a common lubrication system therefor.

2. Background Art

Some articulated vehicles, such as four-wheel drive farm tractors, have a depending gear transfer train for propelling the vehicle. The input of the transfer train is connected to a multi-speed transmission having a longitudinally oriented axis located at a considerable elevation above the axes of the wheels. A housing or drop box contains the depending gear transfer train and provides a sump for the transmission fluid. A pump is driven by the engine of the vehicle which serves to direct fluid from the sump through a control system for operating the transmission and lubricating the components of the transmission and the various gears and bearings of the transfer train.

Heretofore, a dry brake assembly has been located externally of the drop box in the drive line to the wheels for the purpose of serving as a parking brake or auxiliary brake. In such instance the primary dynamic service braking function has been provided by conventional brake mechanisms located at the individual wheels of at least one axle. But improper use of the relatively low energy capacity drive line brake assembly by an unskilled operator has occasionally led to excessive heat build up and wear thereof so that premature servicing problems are encountered. Moreover, these dry drive line brake assemblies are not usually positively sealed against the ingress of dirt and foreign matter with the result that wear of the friction elements is accelerated.

In view of the aforementioned factors it is desirable to make the known dry and open drive line brake assembly a fully enclosed and wet drive line brake assembly in order to extend its service life and to optionally increase its energy absorbing capacity. Under optimum conditions that brake assembly could even function as a dynamic service brake and result in a savings because the individual wheel brake assemblies could be decreased in capacity or eliminated entirely with a reduction in overall cost.

If the wet drive line brake and depending gear transfer train are enclosed in a common elevationally lower compartment the rotating elements of the brake assembly could churn through the lubricating fluid and cause a horsepower loss. While it is well known that it is undesirable to rotate a gear or the like in an appreciable amount of fluid it is not always simple to avoid this problem. Not only are fluid drag losses and fluid heating caused by this action, but also fluid aeration which could detrimentally influence the operation of the pump and associated control system.

U.S. Pat. No. 1,220,810 issued to K. Alquist on Mar. 27, 1917 discloses a gear mechanism that is directed to minimizing fluid drag losses by providing an elevated reservoir in the casing to which the lubricating fluid is directed by the tips of the gear teeth pumping against an associated casing wall. In other words, the gear teeth tips extend into a lower fluid reservoir to a limited extent, and a relatively low-fluid level is maintained therein by the action of the teeth tips as they sweep upwardly adjacent the casing wall.

Although the above-mentioned patent describes a mechanism that can be very effective in reducing fluid drag losses during operation, it requires a complex case and is not conveniently adaptable to the drop box, transfer train and drive line brake assembly discussed above.

Thus it would be advantageous to provide a common housing for containing both the depending gear transfer train and the drive line brake assembly so that they can share the economics of a common lubrication system in the vehicle.

Furthermore, the wet drive line brake assembly should be capable of being conveniently removed from the housing for servicing purposes. And, preferably, these elements should be integrated in such a way that fluid drag losses during operation of the vehicle are minimized.

It is further desirable to have a conveniently releasable sump casing in order to better service the oil intake components and to allow the total fluid capacity to be varied for more effective matching to vehicles of various sizes and horsepower ranges.

The present invention is directed to overcoming one or more of the problems as set forth above.

DISCLOSURE OF THE INVENTION

In one aspect of the invention a vehicle transfer gear and drive line brake mechanism includes a depending gear transfer train having an output gear connected to an output shaft on a lower axis and a drive line brake assembly which is selectively connectable to the output shaft on the lower axis. Advantageously, housing means are provided for defining an enclosed compartment containing the gear transfer train and the drive line brake assembly and a common lubricating fluid therein.

In accordance with another aspect of the invention a vehicle transfer and drive line brake mechanism includes a depending gear transfer train having an output shaft and a member rotatable therewith on a lower axis and a drive line brake assembly connected to the output shaft along the lower axis. Featured are a first means for defining an enclosed compartment containing both the gear transfer train and the drive line brake assembly, and a second means for dividing the enclosed compartment into a brake chamber and a common sump chamber and directing fluid away from the brake chamber to the sump chamber in response to rotation of the member.

Preferably, a housing means supports the depending gear transfer train and drive line brake assembly and defines an enclosed compartment therefor. The housing means features a baffle element that defines a sump chamber and a brake chamber within the enclosed compartment and is so constructed that rotation of a member connected to the output shaft of the gear transfer train will cause fluid to be directed away from the drive line brake assembly outwardly of the brake chamber in response to rotation of the member.

BRIEF DESCRIPTION OF THE DRAWINGS

FIG. 5 is a diagrammatic and centrally sectionalized side elevational view of the transfer gear and drive line brake mechanism illustrated in broken line form in FIG. 1, and showing details of construction of the present invention.

BEST MODE FOR CARRYING OUT THE INVENTION

Figure 1:
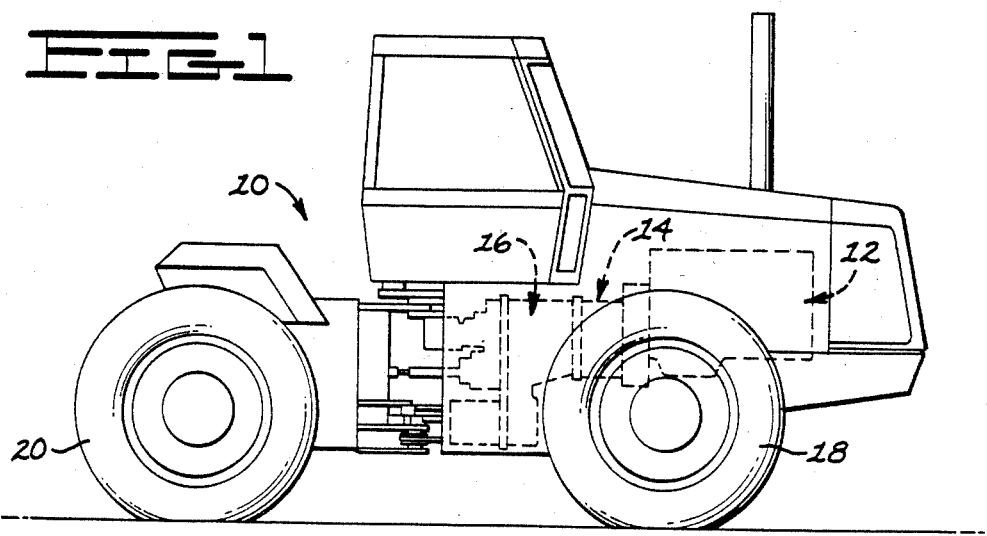
FIG. 1 is a diagrammatic, side elevational view of an articulated wheel-type vehicle showing the arrangement of a portion of the power train thereof, including an embodiment of the transfer gear and drive line brake mechanism of the present invention, in broken lines.

Referring initially to FIG. 1, a four wheel drive vehicle 10 particularly adaptable to agricultural use is illustrated. An engine 12 and a generally cylindrical multi-speed transmission 14 coupled thereto are mounted on the front section of the vehicle, and the transmission extends generally longitudinally and rearwardly into a transfer gear and drive line brake mechanism 16 constructed in accordance with the present invention. In general, such mechanism can powerably rotate front wheels 18 and rear wheels 20 of the vehicle and can stop the vehicle.

As best shown in FIG. 5, the transfer gear and drive line brake mechanism 16 includes a depending gear transfer train 22 driven by the transmission 14. The depending gear transfer train has an input gear 24 disposed on an upper longitudinally extending axis 26, an output gear 28 disposed on a lower longitudinally extending axis 30, and gear means 32 connecting and transferring power between the input and output gears. In the instant embodiment the gear means 32 includes a single transfer gear or idler gear 34. The output gear 28 is releasably connected to a stepped output shaft 36 by a spline connection 38, so that with rotation thereof the front and rear wheels of the vehicle are rotated. A drive line brake assembly 40 is operatively associated with the shaft to stop rotation thereof relative to housing means 42.

The transfer gear and drive line brake mechanism 16 also includes a second input gear 44 rotatably supported within the housing means 42 on the upper axis 26 and coupled to rotate with auxiliary drive means 46. In the instant example the auxiliary drive means includes an engine driven shaft 48 that passes generally straight through the transmission 14 and powers certain hydraulic devices or pumps 50 as a function of engine speed. A power take off (PTO) clutch assembly 52 is generally contained and supported within the housing means at the rear face thereof along a third axis 54 located elevationally between the upper and lower axes 26,30. The PTO clutch assembly is powered by another gear 56 which is in continuous intermeshing engagement with the second input gear 44.

More particularly, the housing means 42 of the transfer gear and drive line brake mechanism 16 shown in FIG. 5 can be seen to include a main case 58 which is supported on the front frame of the vehicle in a conventional manner, not shown. The main case defines a forwardly facing opening 60 for partly receiving and guidably supporting the rear part of the multi-speed transmission 14. A cylindrical access opening 62 defined in the main case at a rear wall 64 thereof is adapted to closely receive a releasable annular access plate 66. The access plate has a stepped cylindrical bore 67 arranged on the upper axis 26 and a lube passage 68 defined diametrically therethrough which is in open communication with the bore and an upper lube passage 70 defined in the main case. An intermediate wall 72 integral with the main case supports a front bearing assembly 74, and the access plate supports a rear bearing assembly 76 upon which the input gear 24 is rotatably mounted. A tubular input shaft 78 serves as the output of the transmission 14 and is selectively driven through a range of speeds in either direction of rotation. The tubular input shaft is connected to the input gear 24 by a sliding spline connection 80, and a bearing assembly 82 serves to rotatably support the engine driven input shaft 48 therewithin.

A coupling shaft 84 is releasably connected to the distal end of the input shaft 48 by a sleeve coupling 86. This sleeve coupling defines a plurality of passages therein as identified generally by the reference numeral 88 for distributing lubricating fluid from the upper to the lower portions of passage 68 around the external periphery thereof and also for directing a portion of the fluid rightwardly when viewing FIG. 5 to lubricate the spline connection 80 and the bearings 74, 76 and 82.

The coupling shaft 84 extends leftwardly and is splined to the second input gear 44 for continually driving it at engine speed. An auxiliary drive shaft 90 is also splined to the second input gear for continually driving the hydraulic devices 50 such as a gear pump 92 and an implement pump 94.

A secondary or auxiliary case 96 supports the hydraulic devices 50, the second input gear 44 and the PTO clutch 52. The auxiliary case is releasably secured to the rear wall 64 of the main case 58 by a plurality of fasteners 98 located about the peripheral front face thereof. A rearwardly disposed auxiliary chamber 100 is thus defined between the auxiliary case and the rear wall 64 of the main case and including the access plate 66. One or more fluid passages 102 defined in the auxiliary case are aligned with corresponding passages in the main case, such as the distribution passage 68, so that fluid can be directed rearwardly to the PTO clutch 52 for lubrication purposes, or alternatively for the selective controlled operation thereof in a conventional manner.

Referring now to the idler gear 34, it is mounted on an opposed pair of tapered roller bearing assemblies 104 seated on a stepped cylindrical bearing support element 106. The bearing support element extends forwardly through a cylindrical opening 108 defined in the rear wall 64 of the main case 58 and into engagement with a rearwardly facing blind bore 110 defined in the lower portion of the intermediate wall 72 of the main case. The bearing support element has a plurality of interconnected passages 112 therein in communication with the distribution passage 68 for lubricating the bearings 104, and is releasably connected to the main case by a threaded fastener 114.

In accordance with a major feature of the present invention, housing means 42 defines an enclosed compartment 116 for containing the gear transfer train 22 and the drive line brake assembly 40 in juxtaposed relation and a common lubricating fluid therein. In addition to the main case 58, the housing means includes a sump housing 118, a brake body 120, and internal wall means 122 for defining a rearwardly disposed sump chamber 124 and a forwardly disposed brake chamber 126 within the enclosed compartment 116.

The drive line brake assembly 40 is located closely adjacent the output gear 28 within the brake chamber 126, and also serves to support the front end of the output shaft 36. More specifically, a cylindrical opening or bore 128 concentric with the lower axis 30 is defined in the wall 72 of the main case 58. A peripheral flange 130 formed on the brake body 120 is releasably connected to the wall 72 by a plurality of peripherally spaced and threaded fasteners 132, with a cylindrical surface 134 of the brake body being pilotably received in the bore 128. The brake body has a stepped bore 136 for supporting a tapered roller bearing assembly 138 and a front seal ring 140.

In addition to the brake body 120, the drive line brake assembly 40 includes a plurality of annular plates and a plurality of annular discs identified generally by the reference numeral 142 which are alternatively connected to the brake body and to an annular hub or drum 144. The output gear 28 is provided with a forwardly extending, integral, and externally splined sleeve 145, and the hub 144 is releasably connected to the output gear 28 via the splined sleeve. A front output flange 146 is releasably connected to the output shaft by splines 148 and by the screwthreaded insertion of an end fastener 150 into the front end of the output shaft and against a retaining plate 152. The output gear 28 and its splined sleeve 145 are axially entrapped between a shaft shoulder 154 and the inner race of the bearing assembly 138. The inner race of the bearing assembly is urged axially to the left against another shaft shoulder 155 at the front of the spline connection 38 when the brake body 120 is installed against the wall 72 by tightening the fasteners 132 and biasing the remainder of the bearing assembly in that direction.

The drive line brake assembly 40 further includes an annular piston 156 which is selectively urged to the left when viewing FIG. 5 via hydraulically pressurized fluid communicated thereto by way of a passage 158 in the brake body 120. When the piston moves to the left it will clamp the interleaved plates and discs 142 together as a unit against a reaction plate 160 to stop rotation of the hub 144, the output gear 28, and the output shaft 36 relative to the main case 58. The piston is automatically retracted or moved back to the right in a conventional manner by a plurality of compression springs, not shown. One or more passages 162 in the brake body 120 serve to direct a preselected amount of lubricating fluid to the plates and discs for dynamic cooling purposes.

The sump housing 118 defines a forwardly facing opening 162 and an annular mounting flange 164. The flange, and thus the sump housing, is releasably connected to the rear wall 64 of the main case 58 by a plurality of peripherally spaced fasteners 166. A rearwardly located cylindrical opening 168 is defined in the sump housing concentrically along the lower axis 30, and the output shaft 36 extends rearwardly through the opening. A tapered roller bearing assembly 170 is releasably secured in place within the opening by an annular retainer 172 so that the rear portion of the output shaft is rotatably supported by the sump housing. A rear flange 174 is releasably connected to the output shaft 65 via a spline 176, and a retaining plate 178 and a fastener 180 releasably secure it in place on the shaft while simultaneously holding the inner race of the rear bearing assembly in proper position against a shaft shoulder 182. A rear seal ring 184 is mounted radially between the rear flange 174 and the retainer 172 to contain lubricating fluid within the enclosed compartment 116 much like the front seal ring 140.

More specifically, and in accordance with another aspect of the invention, the wall means 122 includes an annular baffle element or baffle can 186 which is advantageously utilized during running operation of the vehicle 10 to minimize the amount of fluid in the brake chamber 126 by directing access fluid to the sump chamber 124. A rear end wall 188 of the baffle can is releasably connected to the main case 58 by a plurality of screwthreaded fasteners 190. As can also be visualized with reference to both FIGS. 2 and 5, the end wall 188 of the baffle can 186 has a rearwardly projecting flanged sleeve portion 192 defining a cylindrical opening 194 on the lower axis 30 for closely receiving the output shaft 36 therethrough. An annular seal 193 is seated within the sleeve portion of the baffle can and sealingly engages a cylindrical surface 195 defined on the output shaft 36. Thus the seal restricts the direct transfer of lubricating fluid between the sump chamber 124 and the brake chamber 126.

Figure 2:
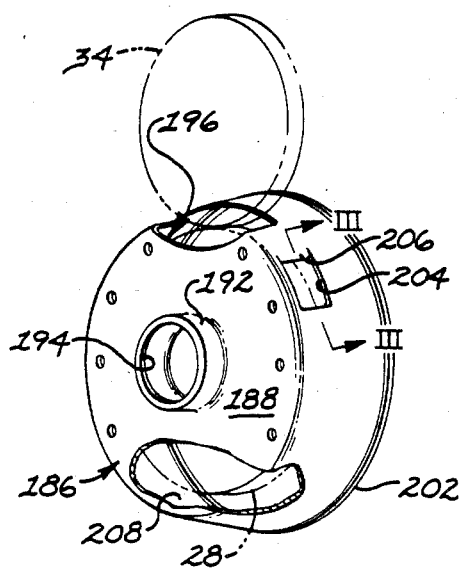
FIG. 2 is a diagrammatic, elevational perspective view of the baffle element illustrated in FIG. 5 to better illustrate details of construction thereof.
Figure 4:
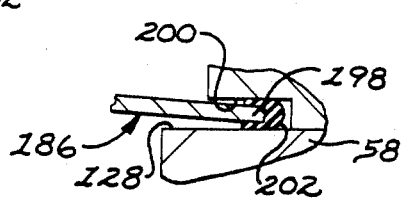
FIG. 4 is an enlarged, sectional view of a portion of the baffle element illustrated in FIG. 5 showing the sealed edge thereof in conjunction with the associated housing means.

As best shown in FIG. 2 the baffle can 186 has an upper gear access opening 196 for allowing the baffle can to be mounted axially on the main case 58 after the idler gear 34 is installed. An outer peripheral edge or front lip 198 of the baffle can is entrapped between the cylindrical opening 128 in the main case 58 and a cylindrical surface 200 formed in the brake body 120 as is illustrated more clearly in FIG. 4. A seal member 202 is preferably connected to the lip 198 to limit the transfer of fluid from the sump chamber 124 into the brake chamber 126 at the front end thereof. This seal member can be installed by simply dipping the baffle can into a viscous sealing material that can solely coat the lip.

Figure 3:
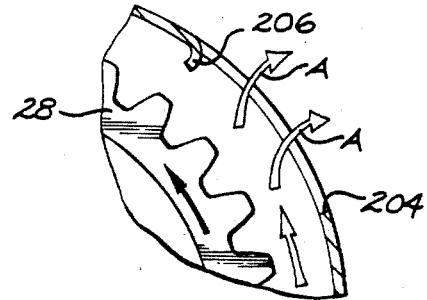
FIG. 3 is an enlarged and diagrammatic sectionalized view of the fluid egress opening in the baffle element illustrated in FIGS. 2 and 5, as taken generally along line III—III of FIG. 2, and with the output gear added for clarity of operation.

Preferably, the baffle can 186 has a pair of oppositely disposed fluid egress openings 204 defined in the upper half thereof with a fluid deflecting edge 206 formed in the can at the upper part of each egress opening as is illustrated in FIG. 3. Alternatively, the baffle can could be more open at the top as by combining the gear access opening 196 and the egress openings 204 into one larger opening, not shown, as long as the baffle can still would define a generally U-shaped trough 208 as can be visualized by reference to FIGS. 2 and 5. The more enclosed baffle can of FIG. 2 is preferred, however, because a large proportion of the lubricating fluid flowing down by gravity from the upper portion of the gear transfer train 22 and from the transmission 14 via the drain passage 209 will be deflected toward the sump chamber 124 rather than undesirably dropping into the brake chamber 126. In the instant embodiment the output gear 28 is conformingly received in the trough 208 in juxtaposed relation to the drive line brake assembly 40.

INDUSTRIAL APPLICABILITY

In operation, the transfer gear and drive line brake mechanism 16 integrates a modularized and serviceable wet drive line brake assembly 40 on the front side of the main case 58 with a removable sump housing 118 on the rear side of the main case. Upon the release of the front flange 146, from the output shaft 36 after the removal of fastener 150 and retaining plate 152, the drive line brake assembly 40 can be removed from within the main case as a modular unit independent of the output gear 28 and the baffle element 186 by screwthreaded release of the fasteners or bolts 132 and rightward movement of the brake body 120 when viewing FIG. 5. Because the splined sleeve 145 is larger in diameter than the inner race and the roller bearing elements of the front bearing assembly 138 it is advantageously not necessary to pull the inner race and bearing elements during such disassembly. Thus the outer race of the bearing assembly, the plates and discs 142, and the brake hub 144 travel forwardly together with the brake body and axially outwardly of the output shaft 36 for convenient servicing. By pulling the inner race of the bearing assembly the output gear 28 can be subsequently moved axially to the right along the spline connection 38 and removed from the output shaft allowing access to the baffle can 186. Screwthreaded release of the fasteners 190 from the main case permits the rightward removal of the baffle can from within the housing. The assembly of these components is merely the reverse of this.

The baffle can 186 is of relatively economical construction, being of formed metallic or plastic sheet material. Yet it provides the major function of at least partially surrounding the lower portions of the juxtaposed output gear 28 and drive line brake assembly 40 in order to divide the common fluid compartment 116 into at least partially separated brake and sump chambers 126,124. Specifically, during running operation of the vehicle 10 the intermeshed gears 24, 34 and 28 are rotating and a preselected quantity of lubricating fluid is ejected out of the opening 162 in the brake body 120 to assure cooling of the brake assembly 40. Rotation of the teeth of the output gear 28, however, adjacent the internal wall of the baffle can is sufficient to urge any fluid collecting in the trough 208 upwardly toward the egress opening 204 as is illustrated in FIG. 3. The rolled over or curved deflecting edge 206 of the baffle can intercept this fluid stream and redirect it radially outwardly of the brake chamber 126 as is indicated by the arrow identified by the letter A. During the reverse operation of the vehicle the opposite egress opening performs the same function. Hence, the fluid level in the brake chamber is maintained at a relatively low level near the bottom of the output gear to effectively reduce fluid drag losses. At the same time the fluid level in the sump chamber can be much higher such as being at the approximate elevation of the lower axis 30.

Thus, the mechanism of the present invention shares a common lubricating fluid compartment for a plurality of components including the auxiliary drive means 46 for powering the hydraulic devices 50 and the PTO clutch assembly 52. Fluid from these components can drain from the auxiliary chamber 100 back into the main case 58 via one or more drain passages 210 for example. Moreover, the drive line brake assembly 40 can be relatively continuously lubricated in order to extend its capacity and service life, and yet the fluid drag losses that would normally be associated with a plurality of plates and discs 142 churning through a relatively high fluid level are greatly reduced by means of the baffle can 186. The gear or transmission pump 92 draws fluid continually from the sump chamber 124 via an intake pipe and filter assembly, not shown but of conventional construction, during operation of the vehicle 10 to complete the circulatory system.

Other aspects, objects and advantages will become apparent from a study of the specification, drawings and appended claims.

We claim:

1. In a vehicle transfer gear and drive line brake mechanism including a depending gear transfer train and a drive line brake assembly for respectively propelling and stopping movement of a vehicle, the gear transfer train having an output gear connected to an output shaft disposed on a lower axis and the drive line brake assembly being connected to the output shaft and disposed on the lower axis, the improvement comprising:
   housing means for defining an enclosed compartment containing the gear transfer train and the drive line brake assembly in juxtaposed relation and a common lubrication fluid therein, the housing means including a main case defining an opening on the lower axis; and
   the drive line brake assembly including a brake body releasably secured to the case in closing relationship to the opening and a plurality of annular plates and discs, the drive line brake assembly being modularized and being removable with the brake body from the output shaft independent of the output gear.

2. The vehicle transfer gear and drive line brake mechanism of claim 1 wherein the housing means includes a sump housing collectively defining a common sump chamber with the main case, and wall means for defining a brake chamber with the brake body, fluid being urged from the brake chamber to the sump chamber outwardly of the wall means in response to rotation of the output gear.

3. The vehicle transfer gear and drive line brake mechanism (16) of claim 2 wherein the wall means (122) includes a baffle element (186) defining a generally U-shaped trough (208), the output gear (28) being conformingly received in the trough (208).

4. The vehicle transfer gear and drive line brake mechanism of claim 2 wherein the wall means includes an annular baffle element of a construction sufficient for generally encircling the drive line brake assembly and the output gear.

5. The vehicle transfer gear and drive line brake mechanism (16) of claim 4 wherein the baffle element (186) defines at least one fluid egress opening (204) in the upper half thereof.

6. The vehicle transfer gear and drive line brake mechanism (16) of claim 5 wherein the baffle element (186) defines deflecting means (206) for directing fluid radially outwardly of the egress opening (204).

7. The vehicle transfer gear and drive line brake mechanism (16) of claim 1 wherein the housing means (42) includes a formed baffle element (186) of relatively thin sheet material defining with the remainder of the housing means (42) a brake chamber (126) and a sump chamber (124).

8. The vehicle transfer gear and drive line brake mechanism (16) of claim 7 wherein the baffle element (186) is annular and generally encircles the output gear (28) and the drive line brake assembly (40).

9. The vehicle transfer gear and drive line brake mechanism (16) of claim 8 wherein the baffle element (186) has an egress opening (204), fluid being urged from the brake chamber (126) out the egress opening (204) into the sump chamber (124) in response to rotation of the output gear (28).

10. The vehicle transfer gear and drive line brake mechanism of claim 8 wherein the baffle element defines an opening for closely receiving the output shaft therethrough.

11. The vehicle transfer gear and drive line brake mechanism of claim 1 including
   wall means for dividing the enclosed compartment into a brake chamber generally containing the drive line brake assembly and a common sump chamber and for directing fluid away from the brake assembly and a common sump chamber and for directing fluid away from the brake chamber to the sump chamber in response to rotation of the output shaft.

12. The vehicle transfer gear and drive line brake mechanism of claim 11 wherein the housing means includes a sump housing releasably connected to the main case opposite the drive line brake assembly.

13. The vehicle transfer gear and drive line brake mechanism of claim 12 wherein the wall means includes a formed sheet material baffle element circumscribing at least the lower half of the output gear.

14. The vehicle transfer gear and drive line brake mechanism of claim 13 wherein the baffle element defines opening means for receiving an annular seal sealingly engaging the output shaft.

15. The vehicle transfer gear and drive line brake mechanism of claim 13 wherein the baffle element defines an outer peripheral edge in contact with the brake body.

16. The vehicle transfer gear and drive line brake assembly of claim 12 including a bearing assembly connected to the brake body and supporting one end of the output shaft.

17. The vehicle transfer gear and drive line brake assembly of claim 16 including another bearing assembly connected to the sump housing and supporting the other end of the output shaft.

* * * * *